(12) United States Patent
Thomas et al.

(10) Patent No.: US 11,390,335 B2
(45) Date of Patent: Jul. 19, 2022

(54) SYSTEM AND APPARATUS FOR INCREASING DOWNWARD FORCE EXERTED ON THE AFT END OF A MOTOR VEHICLE

(71) Applicant: National Association for Stock Car Auto Racing, LLC, Daytona Beach, FL (US)

(72) Inventors: Brandon Thomas, Concord, NC (US); John Probst, Concord, NC (US); Eric Jacuzzi, Concord, NC (US); Christopher A. Popiela, Concord, NC (US); Timothy S. Murphy, Concord, NC (US); Donald E. Krueger, Concord, NC (US); Luca Pignacca, Speedway, IN (US); Alex Timmermans, Speedway, IN (US)

(73) Assignee: NATIONAL ASSOCIATION FOR STOCK CAR AUTO RACING, LLC, Daytona Beach, FL (US)

(*) Notice: Subject to any disclaimer, the term of this patent is extended or adjusted under 35 U.S.C. 154(b) by 84 days.

(21) Appl. No.: 17/082,514

(22) Filed: Oct. 28, 2020

(65) Prior Publication Data

US 2022/0126932 A1    Apr. 28, 2022

(51) Int. Cl.
*B62D 37/02* (2006.01)
*B62D 35/00* (2006.01)
*B62D 35/02* (2006.01)

(52) U.S. Cl.
CPC ........... *B62D 37/02* (2013.01); *B62D 35/007* (2013.01); *B62D 35/02* (2013.01)

(58) Field of Classification Search
CPC ....... B62D 35/007; B62D 35/02; B62D 37/02

USPC ........................................... 296/180.1, 180.3
See application file for complete search history.

(56) References Cited

U.S. PATENT DOCUMENTS

| | | |
|---|---|---|
| 1,389,757 A | 9/1921 | Haynes |
| 2,149,161 A | 2/1939 | Byrnes |
| 2,979,165 A | 4/1961 | McCambridge |
| 3,225,376 A | 12/1965 | Heiler |
| 3,596,974 A | 8/1971 | Adams |
| 4,160,494 A | 7/1979 | McCambridge |

(Continued)

FOREIGN PATENT DOCUMENTS

| | | |
|---|---|---|
| DE | 3115150 A1 | 11/1982 |
| DE | 102016005060 A1 * | 9/2016 |

(Continued)

OTHER PUBLICATIONS

Extended European Search Report for EP Application No. 21205236.9 dated Mar. 18, 2022 (6 pages).

*Primary Examiner* — Jason S Daniels
(74) *Attorney, Agent, or Firm* — Alston & Bird LLP (57) ABSTRACT

A system and apparatus for increasing the safety of motor vehicles traveling at high speeds in the rearward direction is provided. An air dam hingedly secured to the aft end of a vehicle may remain in a stowed position while the motor vehicle is traveling in a forward direction so as not to interfere with aerodynamic performance. When a motor vehicle begins to enter a spin, the air dam may deploy and increase the downward force on the vehicle and as well as act as an air brake, thereby reducing the likelihood of the aft end of the vehicle lifting from the surface during a spin-out at high speeds.

18 Claims, 7 Drawing Sheets

(56) References Cited

U.S. PATENT DOCUMENTS

| | | | |
|---|---|---|---|
| 4,170,377 A | 10/1979 | Ingram | |
| 4,256,339 A | 3/1981 | Ingram | |
| 4,379,582 A | 4/1983 | Miwa | |
| 4,674,788 A | 6/1987 | Ohmura et al. | |
| 4,925,236 A | 5/1990 | Itoh et al. | |
| 5,054,844 A | 10/1991 | Miwa | |
| 5,222,438 A | 6/1993 | Ende | |
| 5,374,098 A | 12/1994 | Nelson | |
| 5,454,619 A * | 10/1995 | Haraway, Jr. | B62D 37/02 296/180.1 |
| 5,544,931 A | 8/1996 | Nelson | |
| 6,196,620 B1 | 3/2001 | Haraway, Jr. | |
| 6,637,805 B2 | 10/2003 | Rees | |
| 6,742,831 B2 | 6/2004 | Rees | |
| 9,469,355 B2 * | 10/2016 | Wolf | B62D 37/02 |
| 9,957,000 B1 | 5/2018 | Ehirim | |
| 2003/0075950 A1 * | 4/2003 | Rees | B62D 35/007 296/180.1 |
| 2004/0036320 A1 * | 2/2004 | Rees | B62D 37/02 296/180.1 |
| 2013/0057022 A1 | 3/2013 | Hoelzel | |
| 2017/0297637 A1 * | 10/2017 | Shinedling | B62D 35/02 |

FOREIGN PATENT DOCUMENTS

| | | | | |
|---|---|---|---|---|
| DE | 102015118076 A1 * | 4/2017 | | B62D 35/007 |
| DE | 202017101000 U1 * | 5/2017 | | B60K 11/08 |
| JP | H 0382681 A | 4/1991 | | |
| JP | H 048681 A | 1/1992 | | |
| JP | H 068859 A | 1/1994 | | |

\* cited by examiner

SYSTEM AND APPARATUS FOR INCREASING DOWNWARD FORCE EXERTED ON THE AFT END OF A MOTOR VEHICLE

FIELD OF THE INVENTION

The present invention relates to a system and method of increasing the downward force exerted on the aft end of a motor vehicle traveling at high speeds in a rearward direction. More particularly, embodiments described herein relate to a system and apparatus suited for competitive racing vehicles that reduces the likelihood of the aft end of the vehicle lifting from surface along which the vehicle is traveling during a spin-out at high speeds.

BACKGROUND

Advances in vehicle safety have made vehicles produced today substantially safer and better able to protect the driver and/or occupants of a vehicle during a collision. Some of these advances have been developed in the world of vehicle racing, where vehicle speeds may be substantially higher than conventional public road speeds and vehicles travel in close proximity, resulting in greater propensity for accidents. Early advances include roll cages that protect the driver compartment of a vehicle from impacts and collisions while seat belts and multi-point harnesses secure a driver within the safety of the roll cage. Such safety technology is reactive and helps a driver avoid injury due to an impact or collision. Further advances in safety are intended to reduce the likelihood of impacts and collisions, or to reduce the speeds of collisions to rely less on post-impact protection of the driver.

When racing vehicles are aligned in a generally forward-facing direction on a racetrack, the aerodynamic forces acting on the car together with the weight of the vehicle generally maintains the tires of the vehicle in contact with the track surface, even at high speeds, when the vehicles use wind deflection devices such as rear-deck spoilers and the like. However, occasionally these vehicles become yawed from their forward path of travel and spin-out at high speeds. In circle-track, oval-track, or so-called "super speedways," with vehicles traveling in a counter-clockwise direction, these spin-outs tend to be in the counterclockwise direction. At high speeds, the aerodynamic forces at certain angles during the spin can cause the vehicle to lift from the track, leaving the driver with no way of controlling the vehicle. Such circumstances can lead to vehicle crashes including vehicle inversion.

SUMMARY OF THE INVENTION

In accordance with the present invention, these and other objects, features, and advantages are achieved by the embodiments illustrated herein by the provision of an improved system and apparatus adapted to be mounted on the underside of the aft end of a motor vehicle.

Embodiments provided herein include an apparatus including: a diffuser secured to an underside of an aft end of a vehicle; an air dam having a first end and a second end, wherein the first end is hingedly secured to the vehicle; and a retention clip, wherein the air dam defines a stowed position and a deployed position, wherein in the stowed position, the retention clip secures the second end of the air dam to the diffuser, wherein in a deployed position, the second end is spaced from the diffuser, and wherein the air dam moves from the stowed position to the deployed position in response to the retention clip releasing the air dam and at least one of gravity or impinging air on the air dam driving the second end of the air dam away from the diffuser. According to an embodiment, the diffuser comprises at least a first vane and a second vane, wherein the first vane and the second vane extend perpendicularly from the diffuser, wherein the air dam defines a first edge extending between the first end and the second end and a second edge extending between the first end and the second end, wherein the first edge abuts the first vane and the second edge abuts the second vane.

According to an embodiment, in the deployed position, the first edge of the air dam abuts the first vane and the second edge of the air dam abuts the second vane, wherein an opening is defined by the diffuser, the second end of the air dam, the first vane, and the second vane, and wherein air is received into the opening in response to the vehicle moving in a direction of the aft end of the vehicle. According to an embodiment, air received into the opening in response to the vehicle moving in a direction of the aft end of the vehicle produces a downward force on the aft end of the vehicle. According to an embodiment, at least one of the first vane or second vane comprise a structure to prevent the air dam from opening beyond the deployed position. According to an embodiment, at least one of the first vane or second vane comprise a structure to lock and retain the air dam in the deployed position.

The apparatus of an embodiment includes where the retention clip releases the air dam in response to the vehicle moving in a direction of the aft end of the vehicle above a predetermined speed. According to an embodiment the retention clip comprises a pin received within an opening of a portion of the air dam, wherein the retention clip releasing the air dam comprises withdrawing the pin from the opening. According to an embodiment, the air dam comprises a retention tab, wherein the opening is defined within the retention tab. According to an embodiment, the air dam functions as an air brake to slow the vehicle in response to being in the deployed position and the vehicle traveling in a direction of the aft end of the vehicle. According to an embodiment, the air dam produces a downward force on the aft end of the vehicle in response to being in the deployed position and the vehicle traveling in a direction of the aft end of the vehicle.

Provided herein is a system including: a roof flap hingedly attached to a roof of the vehicle and defining a stowed position in which the roof flap lies flat relative to the roof of the vehicle and a deployed position in which a trailing edge of the roof flap is raised relative to the roof of the vehicle; an air dam hingedly secured to an underside of the vehicle proximate an aft end of the vehicle, wherein the air dam defines a stowed position in which the air dam is raised relative to the underside of the vehicle and a deployed position in which the air dam is lowered relative to the underside of the vehicle; and a retention clip securing the air dam in the stowed position, wherein the air dam moves from the stowed position to the deployed position in response to the retention clip releasing the air dam, and wherein the retention clip releases the air dam in response to the roof flap moving to the deployed position. According to an embodiment, the roof flap moves to the deployed position in response to the vehicle moving in a direction toward the aft end of the vehicle.

According to an embodiment of the system, the roof flap moves to the deployed position in response to the vehicle moving in a direction toward the aft end of the vehicle above a predefined speed. According to an embodiment, the air dam, in the deployed position, produces a downward force on the aft end of the vehicle in response to the vehicle traveling in a direction toward the aft end of the vehicle above a predefined speed. According to an embodiment, the roof flap is positioned at an aft end of the roof and is angled between 35-55 degrees counterclockwise from a centerline of the vehicle. According to an embodiment, the system further comprises at least one variable length connector having a first end secured to proximate the second end of the air dam and a second end secured to the underside of the vehicle. According to an embodiment, the system further comprises at least one variable length cable having a first end secured to an underside of the roof flap and a second end secured to the retention clip.

BRIEF DESCRIPTION OF THE DRAWINGS

Reference will now be made to the accompanying drawings, which are not necessarily drawn to scale, and wherein.

DETAILED DESCRIPTION

The present invention will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements.

As used herein, it will be understood that the term "forward path of travel" means the direction the vehicle is moving when operated under normal conditions such that the longitudinal axis of the vehicle is parallel to the track and the front of the vehicle is facing forward. Likewise, a direction yawed from a forward path of travel means the longitudinal axis of the vehicle is rotated about its vertical axis, as occurring during a spin, such that the vehicle is moving in a direction toward its aft end.

When a vehicle starts to spin (i.e. becomes yawed), the air passing over the hood, roof and rear deck can lower the air pressure, may cause lift, and in extreme circumstances, the lift may be sufficient to cause the vehicle to lift off the track. As the car rotates past 90° during spin-out, the rear or aft of the vehicle becomes the leading edge. The sudden lowering in air pressure on the vehicle's horizontal surface during the spin-out—when the yaw angle ranges from 70° to about 180° when the vehicle is going over 140 miles per hour—may cause the vehicle to lift off the surface of the track. This may result in the vehicle becoming airborne or flipping.

In addressing safety and performance considerations, designers must consider the physical forces acting on the moving vehicle. In aerodynamic terms, these forces are expressed by lift, drag, weight, and thrust. Thrust is provided by the vehicle's engine and applied by the vehicle powertrain through the wheels and tires is counteracted by drag. Lift is created by the air flowing under the vehicle and over contoured surfaces. The lift force is responsible for causing vehicle to become airborne. It is therefore desirable to minimize lift forces the vehicle experiences and to counteract the lift forces with down force, even when the vehicle is not traveling in the forward direction.

Lift may be counteracted by the vehicle's weight and spoilers or air dams on the vehicle surface in addition to louvres or ducting to direct airflow in a more desirable path through or around a vehicle to mitigate lift. Increased vehicle weight for the purpose of reducing lift negatively affects vehicle performance. Therefore, it is preferential to reduce lift by adding aerodynamic control surfaces and devices such as spoilers or air dams. Spoilers or air dams work by disrupting air flow and create a downward force on the vehicle. Downward force ("down force") or negative lift may be produced when there is a higher pressure on the top of the vehicle than there is pressure on the underside of the vehicle. Down force is primarily generated over horizontal areas such as the hood, roof, rear deck, spoilers (e.g., rear-deck spoilers and chin spoilers) and underside of the vehicle through diffusers.

It will be understood by those familiar with competitive racing that conventional racing vehicles are designed to achieve the fastest possible speeds within the regulatory regime of a sanctioning body, such as the National Association for Stock Car Racing (NASCAR). Safety is a primary concern with vehicles achieving such high speeds and being capable of exceeding 200 mph. In this regard, the racing vehicle body should generally be designed to reduce drag along while increasing down force.

Previous efforts to improve vehicle safety with regard to aerodynamic control surfaces saw the addition of roof flaps, which were added to vehicles to increase the down force acting on the vehicle during a spin. In their stowed position, roof flaps lie flat or relatively flat on the roof of the vehicle. When a vehicle becomes yawed, the roof flaps enter the deployed position, such that they are substantially raised from the roof. The negative pressure caused by high speed air traveling over the roof of the vehicle during a spin causes deployment of the roof flaps without requiring any deployment mechanism or mechanical trigger. The substantially vertical surface created by the deployed roof flaps spoils the air traveling over the surface of the roof, thereby increasing the downforce acting on a vehicle during a spin, while also functioning as an air-brake to slow the vehicle when it is traveling backwards, and possibly also functioning to induce spin to return the vehicle to a forward direction.

While roof flaps have improved vehicle safety by reducing the likelihood of a vehicle becoming airborne while traveling backwards at substantial speeds, the Applicant has found additional improvements to supplement roof flaps and to better retain a vehicle spinning or traveling backwards at high speeds on the surface along which it is traveling.

Accordingly, Applicant identified a need for an improved system and apparatus that increases the down force acting on a yawed vehicle during a high-speed spin and deflects the movement of air beneath the underside of the rear of the vehicle.

Figure 1:
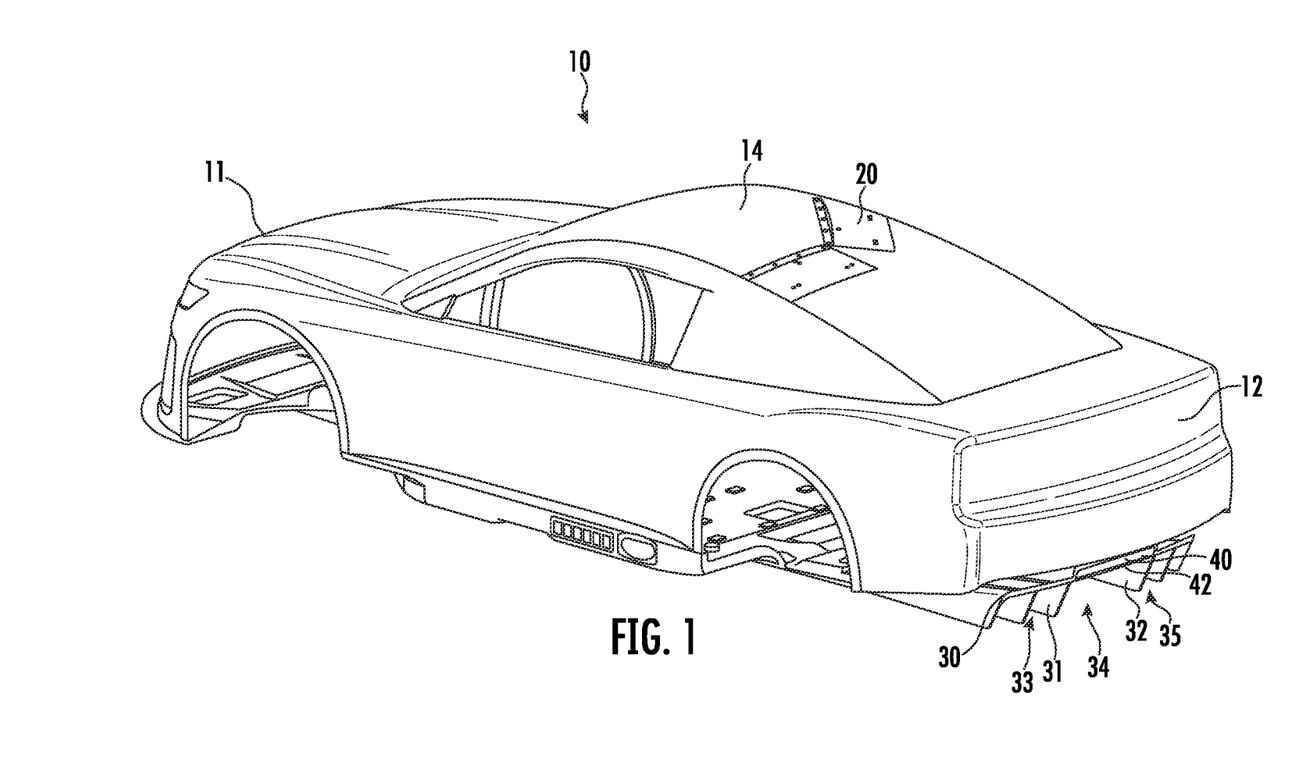
FIG. 1 is a perspective view of a motor vehicle viewed from the aft end of the vehicle of the present invention illustrating the roof flaps in the stowed position, diffuser, and air dam in the stowed position.

As illustrated in FIG. 1, a motor vehicle 10 having a front end 11, an aft end 12, and a roof 14 is shown. A roof flap 20 is shown in the stowed position and is hingedly attached to the roof 14 of the vehicle 10. The roof flap 20 may rotate to a deployed position when the vehicle becomes yawed such that the trailing edge of the roof flap 20 is raised relative to the roof 14 of the vehicle 10 in response to air flowing under the roof flap 20 and raising it relative to the roof 14. Embodiments may include one or more roof flaps positioned proximate the aft end of the roof 14 of the vehicle 10. In some embodiments, such as for a vehicle designed for racing in a substantially circular or oval-shaped track in a counterclockwise direction, the roof flap 20 may be positioned near the right rear of the vehicle and may be angled 35-55 degrees counterclockwise from the centerline of the vehicle. In this way, if the vehicle becomes yawed, typically in the counterclockwise direction for a vehicle traveling counterclockwise on a circle or oval track, the angled right roof flap may respond quickly by entering the deployed position, thus disrupting air flow over the roof and creating additional down force. Positioning the roof flap 20 at an angle as described and illustrated enables the roof flap 20 to deploy while the vehicle is spinning and before the vehicle rotates a full 180 degrees traveling with the aft-end of the vehicle leading. Such early deployment may mitigate some of the aerodynamic forces that tend to lift the vehicle as it spins in the counterclockwise direction.

A diffuser 30 is secured to the underside of the aft end 12 of the vehicle 10. When the vehicle is traveling at speed in the forward direction, the diffuser 30 accelerates air flow under the vehicle as it exits from under the vehicle and create an area of low pressure, thus creating down force on the vehicle. The diffuser 30 may have at least a first vane 31 and second vane 32 which extend substantially perpendicularly from the diffuser 30 creating channels 33, 34, and 35 through which the air flows and exits from underneath the vehicle when it is traveling in a forward direction.

Figure 4:
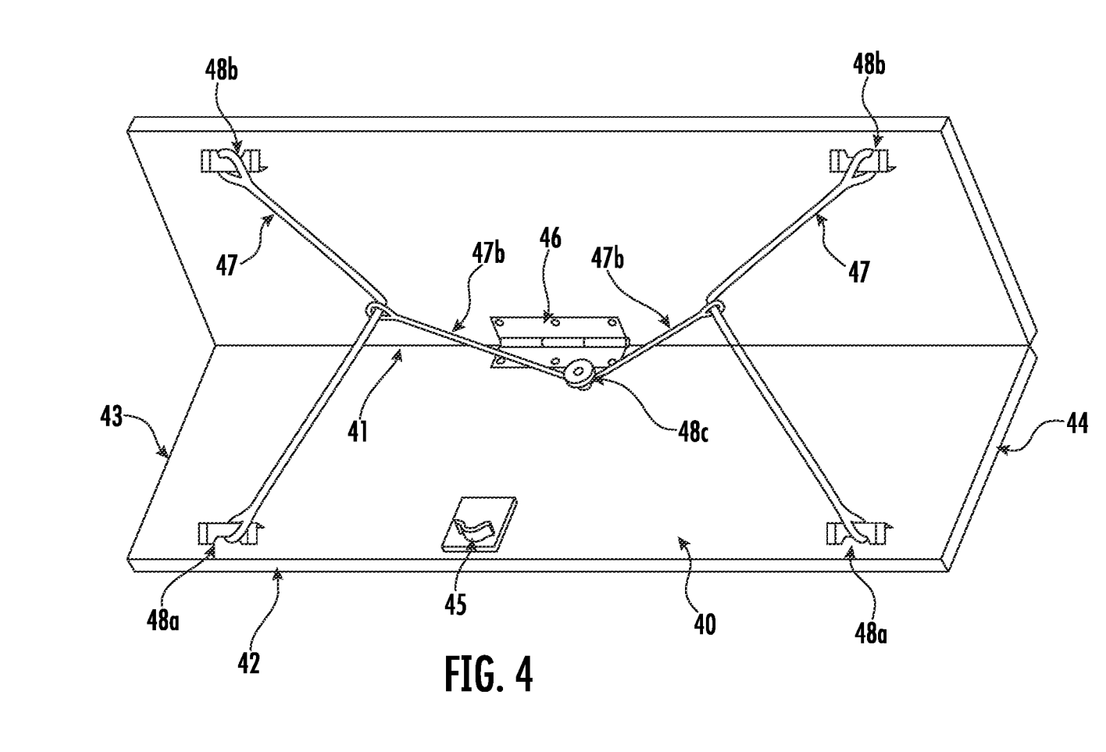
FIG. 4 is a perspective view of the air dam illustrating the air dam framework while in the deployed position.
Figure 5:
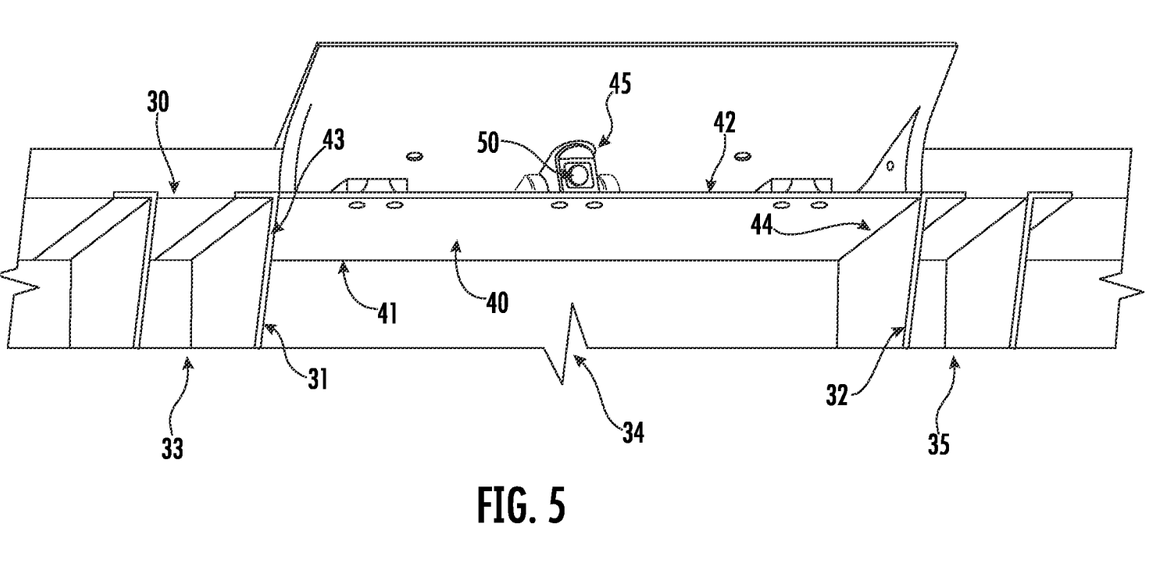
FIG. 5 is a closer perspective view from aft end of the vehicle showing the diffuser and air dam while the air dam is in the stowed position.

According to an example embodiment described herein, an air dam 40 is shown in the stowed position and is hingedly secured to the vehicle at a first end 41 (shown in FIGS. 4 and 5). The air dam is positioned between the first vane 31 and second vane 32 of diffuser 30. In the stowed position, a retention clip 50 (depicted in FIG. 5), secures a second end 42 of the air dam 40 to the diffuser 30 such that the air dam 40 does not interfere with the aerodynamic performance of the diffuser 30 of the vehicle 10 while traveling in the forward direction.

Figure 2A:
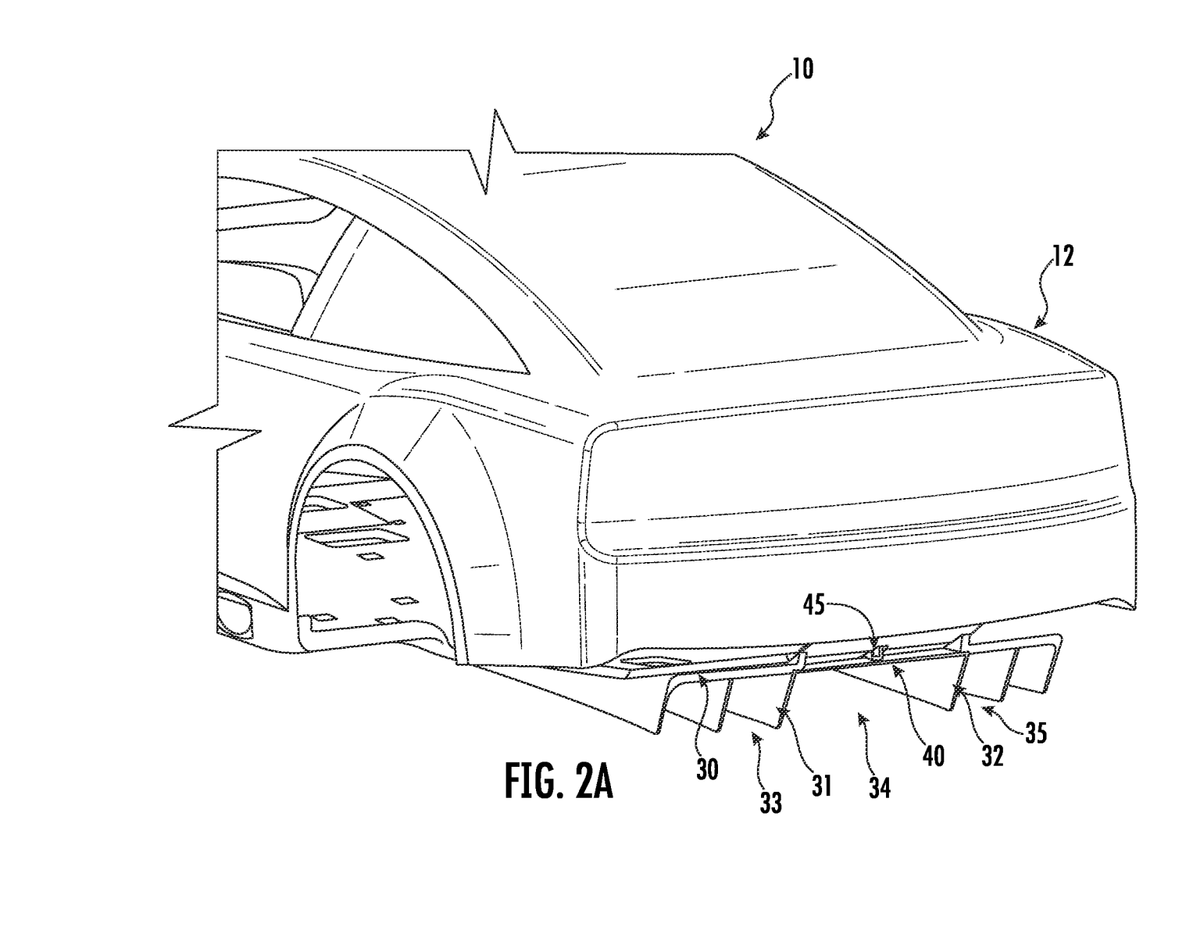
FIG. 2A-B is a perspective view of the aft end of the motor vehicle showing the air dam in the open and stowed position.
Figure 2B:
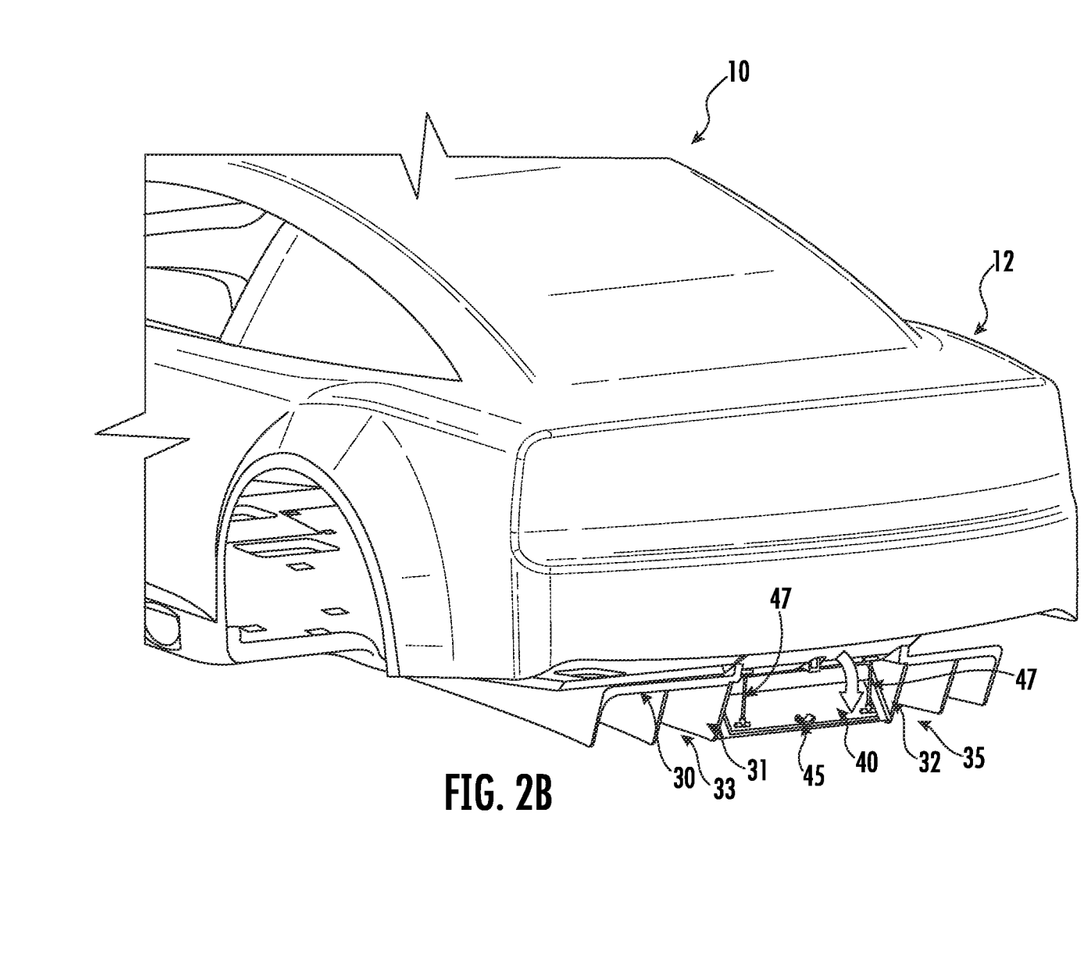

The diffuser 30 and air dam 40 are further depicted in FIG. 2A-B. As previously described, the diffuser 30 may include a first vane 31 and second vane 32 that extend substantially perpendicularly from the diffuser 30. FIG. 2A shows the air dam 40 in the stowed position. FIG. 2B shows the same perspective view but with air dam 40 in the deployed position. In either instance, the air dam 40 is located between the first vane 31 and second vane 32 of the diffuser 30. The air dam 40 will move from the stowed position to the deployed position in response to the vehicle becoming yawed above a predefined speed. This deployment may be triggered through a number of actuation mechanisms such as through deployment of the roof flap 20 as described further below. In response to the air dam 40 being deployed, the second end 42 of air dam 40 will rotate about its hinge such that it is spaced from the diffuser 30. The distance the second end 42 of the air dam 40 is spaced from the diffuser 30 may be determined by the length of the at least one variable length connector 47 attached to the second end 42 of air dam 40 and the diffuser 30. This variable length connector 47 prohibits the air dam 40 from over-rotating and reaching a position where it may be damaged by the surface along which the vehicle is traveling, or reaching a position where the functionality of the air dam is decreased (e.g., when the second end 42 of the air dam rotates too far about the hinge).

Optionally, at least one of the first vane 31 and the second vane 32 may include a tab or other structure to stop the air dam 40 from opening past the deployed position. The tab or other structure to stop the air dam 40 from opening past the deployed position may further serve to lock and retain the air dam 40 in the deployed position. Such a tab or other structure (e.g., a ledge on the vane or a pin extending from the vane) may be positioned proximate the interface between the deployed air dam 40 and the first vane 31 and/or the second vane 32.

Figure 3:
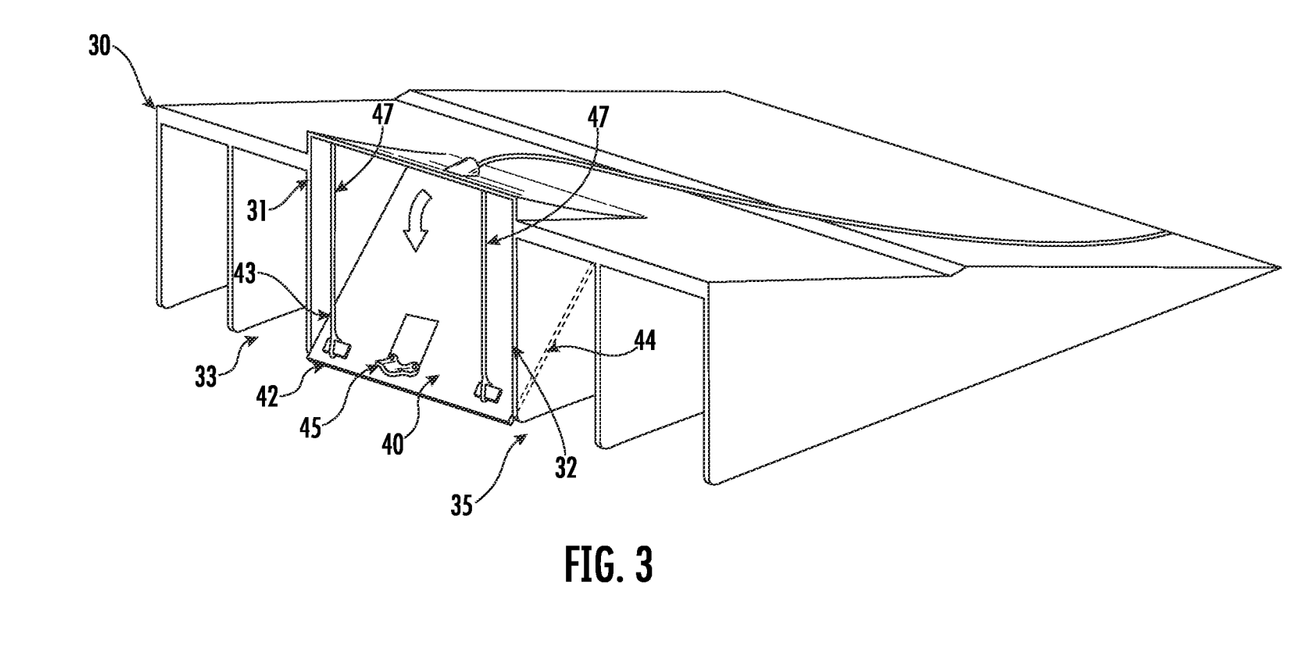
FIG. 3 is a perspective view of the diffuser and air dam illustrating the air dam in the deployed position.

FIG. 3 shows the air dam 40 in the deployed position in greater detail. As shown, the air dam 40 further includes a first edge 43 and second edge 44, wherein the first edge 43 is adjacent to the first vane 31 and the second edge 44 is adjacent the second vane 32 of diffuser 30. Specifically, a first edge 43 of the air dam 40 extends between the first end 41 and second end 42 and abuts the first vane 31. Similarly, the second edge 44 of the air dam 40 extends between the first end 41 and second end 42 and abuts the second vane 32. In some embodiments, the air dam 40 is centered within the diffuser 30. Optionally, more than one air dam 40 may be employed; however, multiple air dams may be employed using the same functionality of the single air dam disclosed through the illustrations provided herein.

When the air dam 40 is in the deployed position and the vehicle is traveling in the aft direction or backwards, air is received in an opening defined by the second end 42 of the air dam, the first vane 31, the second vane 32, and the diffuser 30. The air is caught or dammed within this opening and bounded on all sides, including the first vane 31, the second vane 32, the air dam 40, and the diffuser 30. The flow of air into the opening creates an additional and substantial down force on the aft end of the vehicle in the area forward of the deployed air dam 10 as it travels in the aft direction, where the down force caused by the air dam 40 in the deployed position increases with increasing speed in the aft direction and helps to slow the vehicle based on the air resistance provided by the air dam 40.

As configured, the opening defined by the deployed air dam 40 admits more flowing air as the degree of yaw of the vehicle 10 increases during a spin with respect to the forward path of travel. The increased amount of air flowing into the opening and pressing against the deployed air dam 40 distributes air pressure differentials acting on the surface of the vehicle in such a manner as to increase the amount of down force acting on the vehicle. Further, the maximum amount of down force is produced when the vehicle is yawed 180 degrees from the forward path of travel, i.e. traveling backwards.

According to some embodiments, when the roof flap 20 deploys in response to the vehicle becoming yawed, a variable length cable 52 (shown in FIG. 5) may connect the roof flap 20 to a mechanism to deploy the air dam 40 such that the air dam transitions to the deployed position responsive to the roof flap 20 deployment. In this way, both the deployed roof flap 20 and air dam 40 work in tandem to create down force on the yawed vehicle and prevent the vehicle from becoming airborne.

Turning now to FIG. 4, a different perspective showing the framework of the air dam 40 in the deployed position is shown. The first end 41 of the air dam 40 can be seen hingedly secured to the underside of the vehicle 10 by a hinge 46. In some embodiments, there may be more than one hinge securing the air dam 40 to the underside of the vehicle 10. Optionally, the air dam 40 may be connected to the vehicle (and/or the diffuser 30) via a living hinge where a material, such as a reinforced rubber material secured along one edge to the first end 41 of the air dam 40 and along a second edge to the vehicle or the diffuser 30. As previously described, the at least one variable length connector 47 may determine the distance the second end 42 of the air dam 40 is spaced from the diffuser 30. In some embodiments, the length of the variable length connector is long enough to maximize surface area coverage of the air dam 40 but short enough such that there is no danger of the air dam 40 reaching the track or surface along which the vehicle is traveling when deployed.

The at least one variable length connector 47 may have a first attachment 48a point near the second end 42 of the air dam 40 and a second attachment 48b point on the underside of the diffuser 30. In some embodiments, the first attachment point 48a and the second attachment point 48b may be vertically aligned. In some embodiments, an additional attachment 48c point may be included near the first end 41 of the air dam 40. An additional variable length connector 47b may be used to connect the additional attachment point 48c and the variable length connector 47. In this way, some of the force exerted on the variable length connector 47 when the air dam 40 is deployed is offloaded. In some embodiments, one end of the additional variable length connector 47b may comprise a clip that freely moves about the variable length connector 47.

In some embodiments, at least two variable length connectors 47 connect the air dam 40 to the diffuser 30. The at least two variable length connectors 47 may be spaced equidistant from the center of the diffuser and each have a first attachment point 48a near the second end 42 of the air dam 40 and a second attachment point 48b on the underside of the diffuser 30. In some embodiments, an additional attachment point 48c may be included near the first end 41 of the air dam 40. Two additional variable length connectors 47b may be used to connect the additional attachment point 48c to the variable length connector 47.

In some embodiments, the variable length connector 47 is comprised of a woven fabric. In this way, there may be an associated elasticity with the at least one variable length connector 47 such that the connector may slightly stretch during the transition of the air dam 40 from the stowed position to deployed position.

While the example embodiment of FIG. 4 illustrates a variable length connector 47 to preclude the air dam 40 from opening or deploying beyond a predetermined position, as noted above, the vanes of the diffuser 30 may include mechanical stops that prevent the air dam 40 from opening beyond a predetermined position. Further, these mechanical stops may be tabs that retain the air dam in the deployed position once deployed.

Turning now to FIG. 5, a closeup view of the air dam 40 in the stowed position is shown. While in the stowed position, the air dam 40 is substantially flat against the underside of the vehicle such that is does not hinder the performance of the diffuser 30 of the vehicle and allows the diffuser to perform its aerodynamic function of creating downforce while the vehicle is traveling in the forward direction. A retention clip 50 may secure the air dam in the stowed position.

The air dam 40 may comprise a retention tab 45 positioned near the center of the second end 44 of the air dam. The retention tab 45 may extend upward from near the second end 44 of the air dam 40. The retention tab 45 may define an opening. In some embodiments, the opening may be sized such that a pin 51 of the retention clip 50 may be received within the retention tab 45 opening.

Figure 6:
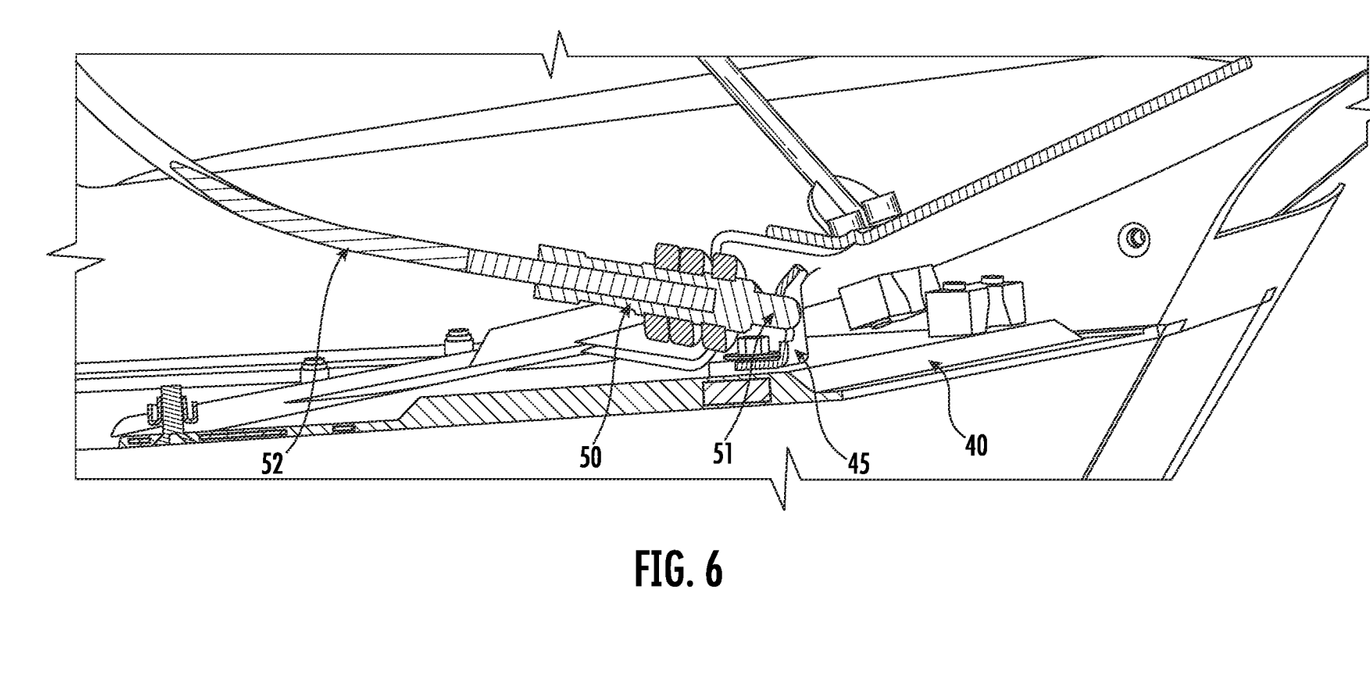
FIG. 6 is a perspective side view showing the retention clip securing the air dam in the stowed position.

As shown more clearly in FIG. 6, the pin 51 is inserted in the opening of the retention tab 45 thereby securing the air dam 40 in the stowed position. A variable length cable 52 connects the retention clip 50 to the roof flap 20. In the event the vehicle 10 becomes yawed and is traveling above a predetermined speed, the retention clip 50 releases the air dam 40 from its currently stowed position to the deployed position. In some embodiments, this may be accomplished by the retention clip 50 withdrawing the pin 51 from the retention tab 45 opening. In some embodiments, this may be in response to the roof flap 20 transitioning from a stowed position to a deployed position. In some embodiments, this transition results in the roof flap 20 applying a considerable force on the pin 51 via the variable length cable 52 such that the pin 51 is extracted from the retention tab 45 opening.

Advantageously, the described configuration allows for the passive deployment of the air dam 40 such that there are no required computational components. In this way, the air dam 40 does not fail to deploy in situations where the vehicle 10 traveling above a predetermined speed becomes yawed. Similarly, the roof flap 20 also passively deploys. In operation, when the motor vehicle is traveling at a high rate of speed and begins moving in a direction of the aft end of the vehicle, e.g. becomes yawed, the roof flap 20 is activated when the low pressure of air moving across the roof creates pressure differentials and causes the roof flap 20 to transition from the stowed position to the deployed position. When the roof flap 20 is in the deployed position, air is caught by the roof flap generating a down force acts on, the vehicle 10. In some embodiments, the roof flap's transition from stowed to deployed is accomplished by means of springs such that the transition occurs almost instantaneously from when the roof flap 20 is activated by the pressure differential.

The roof flap 20 may be connected to air dam 40 by way of a variable length cable 52, retention clip 50, and pin 51. In operation, when the roof flap 20 is deployed, the deployment is forceful enough to withdraw the pin 51 from the retention tab 45. Once the pin 51 is removed from the retention tab 45, the air dam 40 transitions from a stowed position to an open position due to gravitational force, impinging air on the air dam 40, or a combination thereof. The air dam 40 will pivot from it's hinge 46 until it's at least one variable length connector 47 connecting the second end 42 of the air dam 40 to the diffuser 30 is taut. Immediately upon the release of the air dam 40, a down force acts on the air dam 40 and thus, on the vehicle 10. The amount of down force produced on the yawed vehicle increases as the degree of yaw increases, up to a maximum amount of down force when the vehicle is yawed 180 degrees from the forward path of travel, i.e. traveling backwards.

In addition to producing down force, air dam 40 in the deployed position may also function as an air brake to slow the vehicle. In this way, the air dam 40 increases the deceleration of the vehicle and thus reduces the vehicle velocity more quickly below the critical liftoff speed at which the vehicle would leave the ground. By decreasing the speed of the vehicle, the driver may be able to regain control and take corrective action.

A vehicle entering a spin may not suffer any damage and may be capable of returning to racing without requiring a pit stop. The air dam 40 described herein would not preclude the vehicle from continuing to race after deployment of the air dam 40. In an example embodiment in which the roof flap 20 causes the air dam 40 to deploy, as the roof flaps return to their stowed position flat along the roof, the variable length cable 52 is no longer in tension, and the pin returns to a position whereby it can engage the retention clip 50 of the air dam 40. The air dam 40 may, in some circumstances, be configured to be forced to the stowed position in response to the vehicle traveling at sufficient speed in the forward direction to drive air through the diffuser 30 and close the air dam 40 to the stowed position. In such a scenario, the retention clip may press against the pin 51 similar to a door latch until the pin 51 reaches the opening in the retention clip, where the pin 51 engages the opening and retains the air dam 40 in the stowed position. Optionally, air passing through the diffuser 30 may not be sufficient to move the air dam 40 to the stowed position, where manual closing of the air dam 40 may be necessary, such as through a pit stop.

While example embodiments provided herein describe a mechanical connection between the roof flap 20 and the air dam 40, namely a variable length cable 52 that releases the retention clip 50 in response to the roof flap 20 deploying, embodiments may use other mechanisms for deploying the air dam. For example, the mechanism may be electromechanical, whereby a sensor detects deployment of the roof flap 20 and causes the air dam 40 to deploy, such as through release of a mechanical clip or deactivation of an electromagnetic latch that held the air dam 40 in the stowed position. Optionally, deployment of the air dam 40 may be performed in response to signals from one or more sensors indicating that the vehicle has entered a spin. Sensors such as directional sensors, one or more gyroscopes, an inertial measurement unit (IMU), wheel sensors, etc. Various mechanisms described herein cause the air dam 40 to deploy when the vehicle enters a spin or is sufficiently yawed to deploy the air dam 40 through mechanical or electromechanical deployment.

This invention has been described in detail with particular reference to preferred embodiments and the operation thereof, but it is understood that variations, modifications, and the substitution of the equivalent means can be effected within the spirit of this invention.

What is claimed is:

1. An apparatus comprising:
   a diffuser secured to an underside of an aft end of a vehicle;
   an air dam having a first end and a second end, wherein the first end is hingedly secured to the vehicle; and
   a retention clip,
   wherein the air dam defines a stowed position and a deployed position, wherein in the stowed position, the retention clip secures the second end of the air dam to the diffuser, wherein in the deployed position, the second end is spaced from the diffuser, and wherein the air dam moves from the stowed position to the deployed position in response to the retention clip releasing the air dam and at least one of gravity or impinging air on the air dam driving the second end of the air dam away from the diffuser.

2. The apparatus of claim 1, wherein the diffuser comprises at least a first vane and a second vane, wherein the first vane and the second vane extend perpendicularly from the diffuser, wherein the air dam defines a first edge extending between the first end and the second end and a second edge extending between the first end and the second end, wherein the first edge abuts the first vane and the second edge abuts the second vane.

3. The apparatus of claim 2, wherein in the deployed position, the first edge of the air dam abuts the first vane and the second edge of the air dam abuts the second vane, wherein an opening is defined by the diffuser, the second end of the air dam, the first vane, and the second vane, and wherein air is received into the opening in response to the vehicle moving in a direction of the aft end of the vehicle.

4. The apparatus of claim 3, wherein air received into the opening in response to the vehicle moving in the direction of the aft end of the vehicle produces a downward force on the aft end of the vehicle.

5. The apparatus of claim 2, wherein at least one of the first vane or second vane comprise a structure to prevent the air dam from opening beyond the deployed position.

6. The apparatus of claim 2, wherein at least one of the first vane or second vane comprise a structure to lock and retain the air dam in the deployed position.

7. The apparatus of claim 1, wherein the retention clip releases the air dam in response to the vehicle moving in a direction of the aft end of the vehicle above a predetermined speed.

8. The apparatus of claim 1, wherein the retention clip comprises a pin received within an opening of a portion of the air dam, wherein the retention clip releasing the air dam comprises withdrawing the pin from the opening.

9. The apparatus of claim 8, wherein the air dam comprises a retention tab, wherein the opening is defined within the retention tab.

10. The apparatus of claim 1, wherein the air dam functions as an air brake to slow the vehicle in response to being in the deployed position and the vehicle traveling in a direction of the aft end of the vehicle.

11. The apparatus of claim 1, wherein the air dam produces a downward force on the aft end of the vehicle in response to being in the deployed position and the vehicle traveling in a direction of the aft end of the vehicle.

12. A system comprising:
    a roof flap hingedly attached to a roof of the vehicle and defining a stowed position in which the roof flap lies flat relative to the roof of the vehicle and a deployed position in which a trailing edge of the roof flap is raised relative to the roof of the vehicle;
    an air dam hingedly secured to an underside of the vehicle proximate an aft end of the vehicle, wherein the air dam defines a stowed position in which the air dam is raised relative to the underside of the vehicle and a deployed position in which the air dam is lowered relative to the underside of the vehicle; and
    a retention clip securing the air dam in the stowed position, wherein the air dam moves from the stowed position to the deployed position in response to the retention clip releasing the air dam, and wherein the retention clip releases the air dam in response to the roof flap moving to the deployed position.

13. The system of claim 12, wherein the roof flap moves to the deployed position in response to the vehicle moving in a direction toward the aft end of the vehicle.

14. The system of claim 12, wherein the roof flap moves to the deployed position in response to the vehicle moving in a direction toward the aft end of the vehicle above a predefined speed.

15. The system of claim 12, wherein the air dam, in the deployed position, produces a downward force on the aft end of the vehicle in response to the vehicle traveling in a direction toward the aft end of the vehicle above a predefined speed.

16. They system of claim 12, wherein the roof flap is positioned at an aft end of the roof and is angled between 35-55 degrees counterclockwise from a centerline of the vehicle.

17. The system of claim 12, wherein the system further comprises at least one variable length connector having a first end secured to proximate the second end of the air dam and a second end secured to the underside of the vehicle.

18. The system of claim 12, wherein the system further comprises at least one variable length cable having a first end secured to an underside of the roof flap and a second end secured to the retention clip.

\* \* \* \* \*